(12) United States Patent
Schulzki et al.

(10) Patent No.: US 11,458,509 B2
(45) Date of Patent: Oct. 4, 2022

(54) SORTER

(71) Applicant: Wipotec GmbH, Kaiserslautern (DE)

(72) Inventors: Alexander Schulzki, Stelzenberg (DE); Matthias Joachim, Pirmasens (DE)

(73) Assignee: Wipotec GmbH, Kaiserslautern (DE)

( * ) Notice: Subject to any disclaimer, the term of this patent is extended or adjusted under 35 U.S.C. 154(b) by 35 days.

(21) Appl. No.: 16/738,635

(22) Filed: Jan. 9, 2020

(65) Prior Publication Data

US 2020/0222947 A1    Jul. 16, 2020

(30) Foreign Application Priority Data

Jan. 11, 2019    (DE) .......................... 102019100631.7

(51) Int. Cl.
*B65G 47/96* (2006.01)
*B07C 5/36* (2006.01)

(52) U.S. Cl.
CPC .................................. *B07C 5/362* (2013.01)

(58) Field of Classification Search
CPC ........ B07C 5/362; B65G 47/94; B65G 47/96; B65G 47/962; B65G 47/945; B65G 15/62; B65G 15/64; B65G 47/647; B07B 1/12
USPC ....................................................... 209/707
See application file for complete search history.

(56) References Cited

U.S. PATENT DOCUMENTS 9,102,336 B2 * 8/2015 Rosenwinkel ......... B65G 47/96

FOREIGN PATENT DOCUMENTS

| DE | 3150328 A | * | 6/1983 | ............. B07C 5/362 |
| EP | 0888829 B1 | | 5/2004 | |
| EP | 2704109 A1 | | 3/2014 | |

OTHER PUBLICATIONS

Manfred; Wurm, "Conveyor Selective Transfer Device Uses Rotatable Prismatic Deflector Enabling Acceptance Or Rejection Of Articles" (English Translation), Jun. 30, 1983, worldwide.espacenet.com (Year: 1983).*

* cited by examiner

*Primary Examiner* — Michael McCullough
*Assistant Examiner* — Molly K Devine
(74) *Attorney, Agent, or Firm* — The Culbertson Group, P.C.

(57) ABSTRACT

The invention concerns a sorter having a base element that can be swiveled around a horizontal swivel axis with a number of support surfaces uniformly arranged about the swivel axis. Each of the support surfaces can be swiveled into a conveyor for conveying a product along a product stream and swiveled out of the conveyor for ejection of a product from the product stream.

16 Claims, 2 Drawing Sheets

SORTER

TECHNICAL FIELD OF THE INVENTION

This invention concerns a sorter for sorting discrete, individually provided products from a product stream.

BACKGROUND OF THE INVENTION

In the industrial processing of discrete products there is often the need to remove defective products from the product stream. Because of desired high throughput rates, the sorting must, as far as possible, take place without a production time lag. There are various known methods for this, in which for example individual products are eliminated from the product stream in a controlled way at points arranged in the product stream. Such devices are elaborate in terms of design and costly to make, since they interfere with the conveyers and in some cases impede regular forward transport of the next products during this operation. Removal of the sorted products also requires additional transport means, which, besides additional costs, mean more construction effort and expenditure.

A device for sorting piece goods, in particular sawn timber, is known from EP 0 888 829 A2. In this case a sorting drum is formed by a large number of wall elements, which are uniformly arranged around a central rotation axis, so that the plane formed by each wall element also includes the rotation axis and two wall elements situated one behind the other in the circumferential direction form a sorting bin to receive the sawn timber.

EP 2 704 10 describes a container return device with a distribution device. A rotating hopper comprises multiple segments arranged around a centric rotation axis, where each segment is designed to receive one container and is formed in each case by two adjacent walls in the circumferential direction and that intersect with each other in the area of the rotation axis at a segment angle.

SUMMARY OF THE INVENTION

The purpose of the invention is to present a sorter for integration into a product stream that enables the sorting of discrete products without great delay and also ensures the simple removal of the sorted products.

A sorter according to the invention is comprised of a base element, which can swivel or rotate around a swivel axis. The base element encompasses multiple flat support surfaces, which extend parallel to the swivel axis and are arranged around this axis in a regular fashion. Thus the support surfaces of the base element form a regular prism with a swivel axis running through the center of the prism. A "regular" arrangement of the number of support surfaces is understood to mean that, by pivoting the base element, each support surface can be swiveled around the swivel axis into a position that was taken by a different support surface before swiveling occurred. In cross section the support surfaces of the base element form a regular polygon.

Each of the support surfaces of the base element is designed to be swiveled into or out of the conveyor of a product stream. A support surface swiveled into the conveyor serves there as a conveying plane along which individual products are conveyed in a conveying direction. Preferably, a support surface that serves as a conveying plane closes a gap between a conveyor belt preceding the sorter and a conveyor belt following the sorter (a roller track, a gliding surface, a chain conveyor, or any other transport means that is suitable for conveying the products instead of an infeed or outfeed conveyor belt is also an option). Coming from the infeed conveyor belt, in each case exactly one product reaches a transport layer defined by a respective support surface and from there passes on in an essentially unchanged conveying direction onto the next conveyor belt, if the product is not intended for removal. The support surface swiveled into the transport layer and thus parallel to the conveying direction is preferably set at the same height as an infeed and an outfeed conveyor belt, so that the transported products can be conveyed over the support surface in a largely continuous and preferably straight movement in the conveying direction.

According to the invention, the base element together with its support surfaces arranged around it can be swiveled around the swivel axis. Within the scope of one such swiveling movement a support surface, which initially served to convey products in the conveying direction on the transport layer, is swiveled out from the conveyor, while another support surface adjacent to the support surface is in turn swiveled into the conveyor and now serves as a new transport layer. If a product intended for removal is situated on the transport layer formed by one of the support surfaces, in that case, when the base element together with its support surface swivels out of the conveyor, said product enters a sorting path that deviates from the conveying direction. While the product to be removed, together with its support surface, is pivoted out of the conveyor, a successive support surface comes into the conveyor as a new transport layer, in order to be able to receive another product and as necessary to sort it.

The direction of rotation of the base element is preferably selected so that when the swiveling begins, the support surface that receives the product moves in the same direction as the products that are delivered to the support surface.

Among other things, the advantage of such a sorter lies in the fact that, unlike the current state of the art, it obviates the need for the back and forth movement of a deflector that effectuates the sorting and that must be moved back into a starting position after a successful sorting operation. Instead the product to be removed together with its supporting surface, is moved out of the conveyor and at the same time another supporting surface of the base element is swiveled into the conveyor as a new conveying plane. This allows for very rapid execution of a sorting operation.

Basically a sorter according to the present invention is designed to hold a specific swivel position at least until a product to be removed lies securely or stably on the support surface that forms the transport layer in order to be removed in the manner prescribed by the invention. If the next product following the aforementioned product is not to be removed, the sorting of the relevant product takes place by a single swiveling of the base element as described above. The next support surface that has been swiveled into the conveyor as the new transport layer for further conveyance of regular products remains in said position until another product to be sorted reaches it. Products not intended for removal ("regular" products) are conveyed along the support surface and leave it in the conveying direction without the base element being swiveled.

The swing angle α, by which the base element is to be swiveled for a sorting operation depends on the number n of the support surfaces of the base element according to the formula $\alpha=360°/n$. Theoretically, the swing angle can also be a multiple of said angle α. In this case, the support surface that immediately follows in the circumferential direction does not reach the conveyor, but rather a different one.

As a matter of expedience, the number of support surfaces is limited to no more than four, preferably three. According to the invention, a base element that has three support surfaces forms, in cross section, an equilateral triangle about the swivel axis situated at the center. Swiveling of the base element for removing a product then preferably takes place by a swing angle $\alpha=120°$, so that the next support surface in the circumferential direction is then swiveled into the conveyor and becomes available to receive another product. Also conceivable is a base element with just two support surfaces, which are parallel to each other and together can be swiveled around a swivel axis lying between them. In this case the swing angle necessary for sorting would be 180°, so that a first support surface that was initially pivoted into the conveyor, swiveled by 180° after a sorting operation, comes to lie under the second support surface, and the second support surface is in turn ready to receive another product in the conveyor. If the geometric conditions of the installation allow it, the number n of support surfaces can also be selected to be greater than four.

Infeed or outfeed means or planes, which are adjacent to the relevant support surface and are preferably flat, preferably align with the support surface in order to ensure a smooth transfer of the products. The arrangement of support surface, infeed plane and outfeed plane can run exactly horizontally or even at a slight tilt, so that in any case gravity is not sufficient to move the product relative to the support surface. A product delivered to the transport layer then lies freely on the support surface arranged in the transport layer, which at the same time forms the spatially uppermost support surface of the base element. Preferably, the swivel axis of the sorter in terms of the invention runs horizontally. In this arrangement, the sorting of a product is supported by gravity as follows: When the base element swivels, the initially nearly horizontal uppermost support surface, with the product lying on it, tilts. The front edge of the support surface, viewed from the swivel direction, moves downward, while the rear end of the support surface initially moves upward a little above the imaginary conveyor level. This temporarily projecting rear end of the support surface "engages" the product that is to be removed from a rear side of the product in the direction of conveyance, while the support surface is swiveled downward out of the conveyor. In this way, depending on the rotary velocity co around the swivel axis, the product, can be accelerated further on its sorting path, in order to remove it as rapidly as possible and, for example, to eject it below the conveyor level or the conveyor into a spatially defined region and/or to toss it into a container. Various sorting paths or trajectories for the sorted products can be established through the choice of the swivel and transport parameters, for example in order to sort products into various containers.

The support surface that is swiveled into the transport layer in each case can in a very simple embodiment be designed as a sliding surface or roller track, along which the conveyed products slide or roll. These embodiments are especially simple in their construction and thus are cost-effective. However, to reliably transport products on the conveyer or along the sorting path care must be taken that the products reach the support surface with a minimum speed that guarantees further conveyance of the product in the conveying direction or onto the sorting path.

Conversely, an advantageous embodiment of the invention provides for a drivable transport means to be provided at least along the support surface that serves as a transport layer in order to actively transport a product lying on the transport layer further in the conveying direction or along a sorting path that deviates from the conveying direction. Such a drivable means of transport ensures the further transport of products particularly well. If a product that arrives at the transport layer is not to be removed (therefore, the base element is not swiveled), a driven transport means along the transport layer ensures that the product is reliably moved further along in the conveyor direction.

Also, in the case of swiveling, a drivable transport means along the relevant support surface supports the further movement of the product intended for removal onto the sorting path. In particular, the drivable transport means can be a conveyor belt, which circulates around the base element L and at least runs along on the transport layer, but preferably on all transport surfaces of the base element. The conveyor belt then passes over the support surfaces, which lie immediately under it, so that a product lying on the conveyor belt in the transport layer is well supported.

Such a sorter is preferably designed so that the conveyor belt moves around the base element or its swivel axis along the individual support surfaces. Preferably, this takes place at the same transport speed V at which the products are delivered to or eliminated from the support surface that is disposed in the transport layer. In this case, a product that is not to be removed is conveyed at a nearly constant speed from an infeed conveyor belt to the conveyor belt that passes over the support surface disposed in the transport layer. Another conveyor belt, which is connected downstream in the conveying direction to the support surface and which is preferably also propelled at the same speed V ensures smooth conveyance of the product over the base element in the conveying direction.

A conveyor belt circulating around the base element is also advantageous for sorting products, since even during the swiveling of the base element a product to be removed is propelled along its sorting path as long as it lies on the conveyor belt. In order to redirect the conveyor belt from one support surface to the next support surface adjacent to in the circumferential direction, according to an advantageous version of the invention, propelled or non-propelled pulleys are provided where two support surfaces meet.

The conveyor belt can be propelled in various ways. A first embodiment provides that at least one of the previously mentioned pulleys at the boundaries between adjacent support surfaces is propelled in order to drive the conveyor belt routed by the rollers around the base element at the same time. This can occur via one or even more or even all of the pulleys which, for reasons of symmetry are expediently provided in the same number as the support surfaces and in each case are arranged where the support surfaces are adjacent to each other. Instead of propelled or non-propelled pulleys a support surface can also transition over a suitable bending radius seamlessly into the adjacent next support surface, so that the base element has a closed circumferential surface.

An alternative embodiment for the drive of a conveyor belt provides that the belt is guided over a drive roller arranged outside of the base element. In this case as well, the belt at least on the support surface positioned in the individual transport layer, has full contact, so that it is well supported there during the conveyance of a product. The other support surfaces of the base element that have been swiveled out of the conveyor do not necessarily have to be in direct contact with the conveyor belt. Instead, the belt on the side of the base element turned away from the transport layer can be guided away from the support surfaces there and guided around the aforementioned drive roller (see in particular FIG. 2). This type of belt drive is somewhat easier to realize in its construction than the said solution with driven pulleys. These pulleys must be driven in particular over a drive mechanism arranged within the base element for rotation. The belt can be propelled via a tractor drive, in which drivers arranged around a drive axle engage into complementary recesses in the conveyor belt, preferably in its edge area.

Since when the base element with the propelled pulleys swivels, these pulleys move around the swivel axis in the circumferential direction, in this variant the movements of the conveyor belt during pivoting are added to those of the base element, which must be taken into account in process control. If on the other hand, the drive roller lies outside the base element, the belt speed can be set or maintained independently of the angular speed of the swiveling element.

According to an advantageous embodiment of the invention a swivel drive is provided that enables automatic swiveling of the base element around the swivel axis, preferably controlled by an upstream control unit. Moreover, the control unit can be designed to control the belt speed of a conveyor belt guided around the base element, and the relevant current swivel angle of the base element can be taken into account at the same time in the control. During swiveling, the conveyor belt can be propelled at conveyer speed or at a different speed, and the angular speed ($\bar{\omega}$) at which the base element is rotated around the swivel axis can preferably be variable according to a preset function in order to be able to flexibly set or adjust the conveyance of a product not slated for removal and in particular the movement of a product that is to be removed along a sorting path.

A method for sorting discrete goods using a sorter of the aforementioned kind is characterized, among other things, by the fact that the swiveling of the base element can always take place in the same direction of rotation around the swivel axis, that is, forward and backward swiveling is not necessary. The fact that a support surface that has been swiveled out of the transport layer is replaced by the next support surface that follows in the circumferential direction, as a new support layer, thus enables very speedy sorting.

The sorter according to the invention can be integrated into a conveyor system, preferably with an outfeed unit adjacent to the sorter downstream. Then regular products can be delivered from the transport layer of the sorter to an outfeed transport layer of the outfeed unit, where the transport layer and the outfeed transport layer preferably align, so that a smooth transfer of the product from the transport layer to the outfeed transport layer is possible. Products being removed are ejected before reaching the outfeed transport layer by swiveling the base element.

The sorter according to the invention is preferably designed to transport or sort individual products. These can be separate products in the sense that in each case exactly one product is delivered to the sorter and is transported further or removed by it. However, also conceivable is the case that a group of products is sent to the transport layer of the sorter together when a criterion for rejection or continued transport applies to the entire product group, thus all products of the group are to be removed or forwarded at the same time. The conditions explained in this application concerning an individual product correspondingly apply for the group.

The sorter according to the invention can be part of an inspection device, which comprises a scale and/or an X-ray inspection unit. It is especially suitable for systems with special hygiene requirements, for example in food processing, since because of its simple construction it is easy to clean.

These and other advantages and features of the invention will be apparent from the following description of representative embodiments, considered along with the accompanying drawings.

DESCRIPTION OF REPRESENTATIVE EMBODIMENTS

Figure 1:
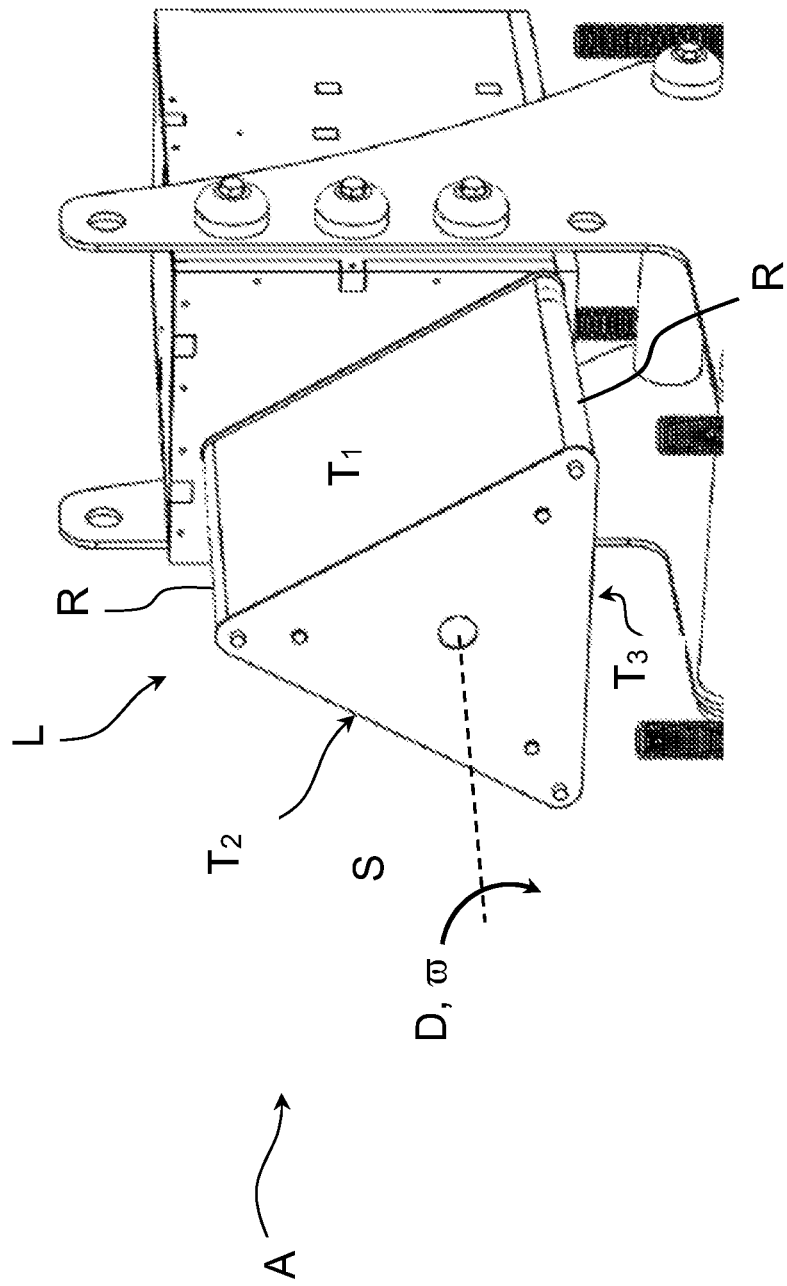
FIG. 1 shows a perspective lateral view of a sorter in a simplified representation.
Figure 2:
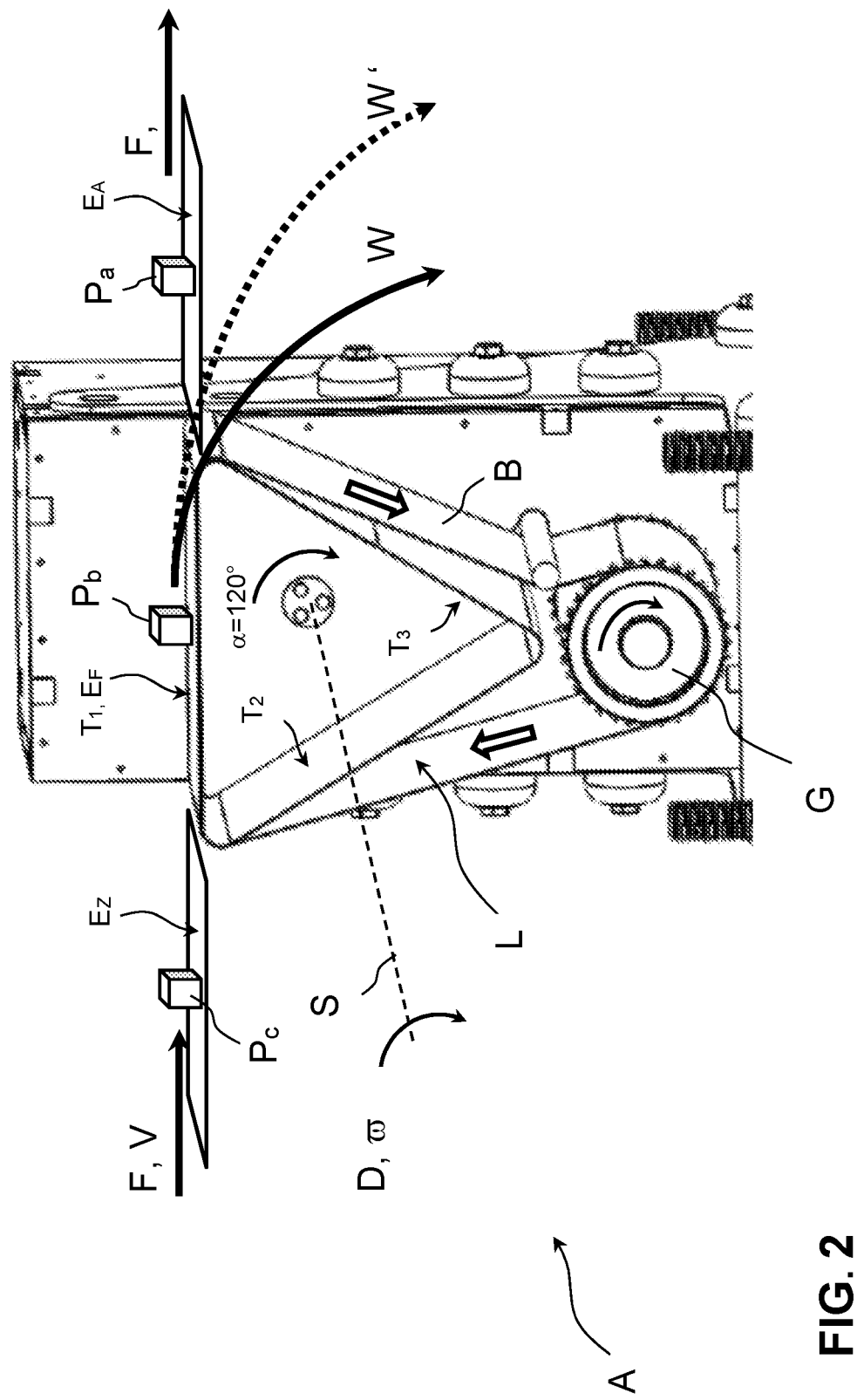
FIG. 2 shows a modified embodiment of the sorter with a drive for a conveyor belt, the drive being located outside of the base element.

FIG. 1 shows a sorter A according to the invention, which is suitable for integration into a conveyor line indicated in FIG. 2. The sorter A is comprised in particular a base element L, which can be swiveled around a swivel axis S, which is arranged centrally to base element L and is horizontally aligned in these illustrated embodiments.

In cross section with respect to swivel axis S the base element L has the outline of an equilateral triangle, where each side is formed in each case by a support surface $T_1$, $T_2$ and $T_3$. The base element L can be swiveled around axis S, so that each of the support surfaces $T_1$ to $T_3$ forms the top side of the triangular base element L and thus forms a transport layer, to which a product to be removed or sent on can be delivered (FIG. 1 shows the base element L in a different rotary position. By pivoting the base element by 60° in the indicated direction of rotation D from the orientation shown in FIG. 1, the support surface $T_2$ forms the transport layer just described).

In the version in FIG. 1 the support surfaces $T_1$ to $T_3$ are designed as low-friction sliding surfaces, on which a product can slide along with a low sliding resistance. By pivoting the base element L around the swivel axis S a product lying on the uppermost support surface can be moved out of the transport layer, so that it can slide down on its relative support surface because of the force of gravity and from there can fall into a sorting container, which is not shown in more detail.

FIG. 2 shows a modified embodiment of a sorter A according to the invention. Here, too, the base element L (shown opened) is formed by three support surfaces $T_1$ to $T_3$, which are regularly arranged around the swivel axis S as an equilateral prism. The base element L can be swiveled around the swivel axis S in the direction D by a drive, which is not shown in more detail, so that in each case one of the support surfaces $T_1$ to $T_3$ takes an upper, preferably horizontal, orientation, in which the relevant support surface comes to lie in an imaginary transport layer $E_F$.

The transport layer $E_F$ preferably lies at the same height as a schematically shown infeed layer $E_Z$ and outfeed layer $E_A$. Individual products $P_a$, $P_b$, $P_c$ are conveyed one after the other in conveying direction F from the infeed layer $E_Z$ over the transport layer $E_F$ to the outfeed layer $E_A$, in order to be sent from there to further processing. In the infeed layer $E_Z$ and/or the outfeed layer $E_A$ conveying means can be provided, for example, conveyor belts, in order to produce or support transport of the products. These transport means are not shown in the simplified view of FIG. 1.

In the embodiment shown for purposes of example in FIG. 2, a conveyor belt B, which is guided around a drivable drive roller G, encircles the base element L. A drive roller G is arranged on the side of the swivel axis S away from the transport layer $E_F$. Rotation of the drive roller G propels the conveyor belt B around the base element L as the two directional arrows show. In doing so, it passes over the support surface $T_1$, which has now been swiveled into the transport layer $E_F$ and which the conveyor belt therefore supports from below in the vertical direction. A product $P_c$ provided from the infeed layer $E_Z$ can therefore be transported further by the conveyor belt B along the transport layer $E_F$ and in the conveyor direction F and can be transferred to the outfeed layer $E_A$.

Products $P_b$ and $P_c$, which are not slated for removal from the product stream, are forwarded in this way from the infeed layer $E_Z$ to the outfeed layer $E_A$. The base element L maintains its rotary position relative to the infeed and outfeed layers without change. The rotary speed of the drive roller G is in this case selected so that the speed of the conveyor belt B corresponds to the speed V at which the individual products are delivered to the transport layer $E_F$ or are taken from it. This ensures a smooth transfer of the products.

The surfaces of the support surfaces $T_1$ to $T_3$ that are turned outward are preferably made of low-friction material, so that the conveyor belt B sliding along on them can be driven with only low sliding resistance.

If a product to be removed from the product stream (for example, product $P_b$ in FIG. 2) reaches the transport layer $E_F$ and the conveyor belt B, which is supported there by the current support surface $T_1$, this product can be removed by swiveling the base element L around the swivel axis S. Upon swiveling the base element L the support surface $T_1$ carrying the product to be removed leaves the transport layer $E_F$. The support surface $T_1$ tilts relative to conveyor direction F and while the rear end of the support surface $T_1$ lifts upward temporarily above the transport layer $E_F$, the forward end of the support surface $T_1$ moves downward below the transport layer $E_F$ and thus below the outfeed plane $E_A$. Depending on the speed of the conveyor belt B and the swivel speed $\overline{\omega}$ of the base element L around the swivel axis S a gap will form between the support surface $T_1$ and the outfeed layer $E_A$, through which the product $P_b$ intended for removal is moved out of the product speed along a sorting path W.

Through the pivoting of the base element L about the swivel axis S not only is the uppermost support surface $T_1$ pivoted out of the transport layer, but the next support surface $T_2$ adjacent to said support surface in the circumferential direction is pivoted into the transport layer $E_F$. It thus takes on the function of the support surface $T_1$ that was just there, in order to receive another product $P_C$, which follows the product $P_B$ that was removed. Said following product can, without the base element L being swiveled again, be sent in the transport direction F to the outfeed plane $E_A$ by the conveyor belt B transporting the product $P_C$ along the second support surface $T_C$, while the base element L essentially remains in the same position. If the product $P_C$ is also to be removed, the previously described swiveling operation is repeated, the product $P_C$ leaves the transport F along the sorting path W and the third support surface $T_3$ reaches the transport layer $E_F$.

The movement of a product $P_b$ that is being removed along the sorting path W can be affected by the speed of the conveyor belt B and the angular speed $\overline{\omega}$ of the base element L. A relatively simple procedure provides that the speed of the conveyor belt B is kept constant and corresponds approximately to the speed V at which the product $P_b$ is delivered to or taken from the sorter along the conveyor. The angular speed m of the base element L can likewise be essentially kept constant during a swiveling operation.

Preferably, however, the angular speed is preset in dependence on the swing angle in order to be able to set a specific falling curve for the product being removed. Preferably, a swiveling operation does not begin until a product being removed has moved over half of the support surface that is supporting the product. If the swiveling operation begins earlier, the product would be located on the segment of the support surface that was initially raised upward a bit above the transport surface $E_F$, which would accelerate the product being removed upward against the force of gravity and could give rise to an uncontrolled further conveyance. However, if the product being removed has reached the front half of the support surface, with a view to the swivel direction, before the beginning of the swiveling operation, it can follow the front half of the support surface that is dipping below the transport layer $E_F$ upon swiveling and can be ejected in a controlled way.

The belt speed of the conveyor belt B and the angular speed $\overline{\omega}$ of the base element L can, moreover, be selected so that a product being removed undergoes accelerating force, which is exerted by the relevant supporting surface on the product, as the following observation illustrates:

A product $P_b$ moving at velocity V in conveyor direction F exactly above the swivel axis S, or in the middle of the support surface $T_1$ lying above it, would from this position follow the force of gravity in a free parabolic trajectory if the base element L were not present. However, since it is present, the free trajectory can only then be observed if the swiveling of the base element L and the speed of the conveyor belt B are appropriately matched. The reverse is correspondingly true: the belt speed and the angular speed can affect the path of the removed product $P_b$ if these parameters are set differently. For example, the belt speed could be set relative to base element L so that the sorted product is engaged by the segment of the relevant support surface that is at the rear in the circumferential direction and from the rotary motion of the base element experiences an accelerated force perpendicular to support surface T. In turn, depending on the parameter $\overline{\omega}$, the current swing angle and the current position of the product $P_b$ along the support surface T that is being pivoted, the point at which the product $P_b$ leaves the pivoting support surface can be determined. From that, different sorting paths can be established, of which one path W' is indicated as an example in FIG. 2.

An alternative to the conveyor belt B drive arrangement shown in FIG. 2 may include one or more driven pulleys included on the base element L itself. For example, in the base element L shown in FIG. 1, each element at the corners of the triangular structure of base element L may comprise a pulley. One or more of these pulleys R may be driven by suitable means to drive a conveyor belt (not shown in FIG. 1) around the base unit. Such an alternative arrangement dispenses with the need for the external drive roller G shown in FIG. 2.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A sorter for sorting products which are transported in a conveying direction along a conveyor, the sorter comprising:
    (a) a base element;
    (b) multiple support surfaces provided on the base element, each support surface lying in a respective plane extending parallel to a swivel axis of the base element, and the support surfaces being evenly arranged around the swivel axis so as to form the sides of a regular prism; and
    (c) the base element being mounted for rotation about the swivel axis so that each of the support surfaces is adapted to be swiveled into the conveyor, each respective support surface when swiveled into the conveyor extending parallel to the conveying direction and providing a transport layer for (i) receiving thereon a product delivered to the sorter by the conveyor so that the weight of the product is received by the transport layer and for (ii) further transport of the product in the conveying direction with the weight of the product received by the transport layer.

2. The sorter of claim 1 wherein the product received on the transport layer is removed from the conveyor by swiveling the base element by a swing angle or a whole number multiple of the swing angle about the swivel axis so that a respective support surface providing the transport layer when the product is received moves out of the conveyor to move the product to a sorting path that departs from the conveying direction.

3. The sorter of claim 2 wherein the swing angle is defined by the expression 360°/n, where 1<n<5.

4. The sorter of claim 2 wherein swiveling the base element about the swivel axis by the swing angle moves a different one of the support surfaces into the conveyor to provide the transport layer, the different one of the support surfaces comprising a respective support surface which is adjacent in a circumferential direction to the respective support surface providing the transport layer when the product was received.

5. The sorter of claim 1 further including a drivable means of transport at least along the transport layer, the drivable means of transport being operable for actively transporting products lying on the transport layer further in the conveying direction or along a sorting path that departs from the conveying direction.

6. The sorter of claim 5 wherein the drivable means of transport comprises a conveyor belt which extends around the base element.

7. The sorter of claim 6 further including a respective pulley between each two support surfaces which are adjacent to each other in a circumferential direction about the base element.

8. The sorter of claim 7 wherein at least one of the pulleys is drivable to propel the conveyor belt.

9. The sorter of claim 6 wherein:
    (a) the conveyor belt is driven by a drive roller arranged with a drive roller axis extending parallel to the swivel axis, the conveyor belt being guided around the drive roller on a side of the drive roller facing away from the transport layer; and
    (b) the drive roller is spaced further from the swivel axis than an imaginary intersection of planes formed by two adjacent support surfaces of the multiple support surfaces.

10. The sorter of claim 6 wherein:
    (a) the base element includes exactly three support surfaces which are arranged at an angle of 120° to each other;
    (b) the conveyor belt circulates around, and is supported by, all three of the support surfaces; and
    (c) at least one pulley is operable for propelling the conveyor belt around the three support surfaces.

11. A method for selectively removing products from a product stream, the method including:
    (a) delivering a first product to a transport layer of a sorter in a first sorter state, the first product being delivered in a conveying direction at a conveyor speed and when delivered resides on the transport layer so that the weight of the first product is received by the transport layer with the first product in position to be conveyed further in the conveying direction with the weight of the first product received by the transport layer, the transport layer in the first sorter state being provided by a first support surface extending parallel to the conveying direction, the first support surface comprising one of multiple support surfaces provided on a base element, each of the multiple support surfaces lying in a respective plane extending parallel to a swivel axis of the base element, and the support surfaces being evenly arranged around the swivel axis so as to form the sides of a regular prism; and
    (b) where the first product is to be removed from the product stream, swiveling the base element about the swivel axis in a rotation direction and through a swing angle to thereby transport the first product further to a sorting path that departs from the conveying direction.

12. The method of claim 11:
    (a) wherein swiveling the base element about the swivel axis in the rotation direction and through the swing angle also moves the sorter to a second sorter state in which a second support surface of the multiple support surfaces provides the transport layer; and (b) further including delivering a second product to the transport layer when the sorter is in the second sorter state, the second product comprising a product immediately following the first product in the product stream.

13. The method of claim 12 wherein the sorter resides in a respective sorter state for each of the multiple support surfaces and reaches each respective sorter state by swiveling the base element in the rotation direction.

14. The method of claim 11 further including transporting the first product along the first support surface on a conveyor belt.

15. The method of claim 11:
(a) wherein where the first product is to be retained in the product stream, maintaining the sorter in the first sorter state; and
(b) further including transporting the first product along the first support surface on a conveyor belt where the first product is to be retained in the product stream and the sorter is maintained in the first sorter state and where the first product is to be removed from the product stream and the base element is swiveled about the swivel axis in the rotation direction.

16. A conveyor system including:
(a) a sorter for sorting products which are transported in a conveying direction along a conveyor, the sorter comprising,
  (i) a base element,
  (ii) multiple support surfaces provided on the base element, each support surface lying in a respective plane extending parallel to a swivel axis of the base element, and the support surfaces being evenly arranged around the swivel axis so as to form the sides of a regular prism, and
  (iii) the base element being mounted for rotation about the swivel axis so that each of the support surfaces is adapted to be swiveled into the conveyor, each respective support surface when swiveled into the conveyor extending parallel to the conveying direction and providing a transport layer for (i) receiving thereon a product delivered to the sorter by the conveyor so that the weight of the product is received by the transport layer and for (ii) further transport of the product in the conveying direction with the weight of the product received by the transport layer; and
(b) an outfeed unit adjacent to the sorter downstream in the conveying direction, the outfeed unit defining an outfeed transport layer substantially aligned with the transport layer.

* * * * *